(12) United States Patent
Lee et al.

(10) Patent No.: US 11,677,452 B2
(45) Date of Patent: Jun. 13, 2023

(54) METHOD AND APPARATUS FOR TRANSMITTING AND RECEIVING SIGNAL FOR TERMINAL-CENTRIC COOPERATIVE TRANSMISSION

(71) Applicant: ELECTRONICS AND TELECOMMUNICATIONS RESEARCH INSTITUTE, Daejeon (KR)

(72) Inventors: Yu Ro Lee, Daejeon (KR); Jae Woo Park, Daejeon (KR); Chang Wahn Yu, Daejeon (KR); Tae Gyun Noh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 276 days.

(21) Appl. No.: 17/082,351

(22) Filed: Oct. 28, 2020

(65) Prior Publication Data
US 2021/0135736 A1    May 6, 2021

(30) Foreign Application Priority Data

Oct. 31, 2019 (KR) .................. 10-2019-0138138
Oct. 13, 2020 (KR) .................. 10-2020-0131741

(51) Int. Cl.
*H04B 7/06* (2006.01)
*H04L 25/02* (2006.01)
(Continued)

(52) U.S. Cl.
CPC ......... *H04B 7/0695* (2013.01); *H04L 5/0048* (2013.01); *H04L 25/0204* (2013.01);
(Continued)

(58) Field of Classification Search
None
See application file for complete search history.

(56) References Cited

U.S. PATENT DOCUMENTS

2011/0182236 A1* 7/2011 Matsumoto ............ H04J 11/004
                                                        370/328
2013/0072243 A1* 3/2013 Yu ........................ H04B 7/0695
                                                        455/509

(Continued)

FOREIGN PATENT DOCUMENTS

| EP | 3641193 A1 | 4/2020 |
|---|---|---|
| WO | 2013/039352 A2 | 3/2013 |
| WO | 2018/231001 A1 | 12/2018 |

OTHER PUBLICATIONS

KIPO Office Action, dated Dec. 20, 2022, for Korean Patent Application No. 10-2020-0131741 which corresponds to the above-identified U.S. application.

*Primary Examiner* — Hassan A Phillips
*Assistant Examiner* — Gautam Sharma
(74) *Attorney, Agent, or Firm* — LRK Patent Law Firm

(57) ABSTRACT

A method for transmitting and receiving signals, performed by a terminal, in a C-RAN environment, includes sequentially transmitting fixed beams; receiving, from at least one first TRP determined as TRP(s) performing signal transmission and reception with the terminal among the plurality of TRPs, control information including information on whether to transmit a reference signal for reception of downlink data and an index of a transmission beam selected for uplink transmission; and receiving the downlink data from the at least one first TRP, and demodulating the downlink data by using a reception beam weight derived from a weight used for transmission of the fixed beams or by using the reference signal.

15 Claims, 10 Drawing Sheets

(51) Int. Cl.
*H04L 5/00* (2006.01)
*H04W 72/21* (2023.01)
*H04W 72/23* (2023.01)

(52) U.S. Cl.
CPC ......... *H04L 25/0224* (2013.01); *H04W 72/21* (2023.01); *H04W 72/23* (2023.01)

(56) References Cited

U.S. PATENT DOCUMENTS

| | | | |
|---|---|---|---|
| 2014/0112355 A1 | 4/2014 | Fang et al. | |
| 2015/0312927 A1* | 10/2015 | Ko | H04W 72/1231 370/336 |
| 2017/0366236 A1* | 12/2017 | Ryoo | H04B 7/043 |
| 2018/0007679 A1* | 1/2018 | Lee | H04W 72/048 |
| 2018/0083680 A1* | 3/2018 | Guo | H04L 5/0007 |
| 2018/0091212 A1* | 3/2018 | Lee | H04L 5/0048 |
| 2018/0124733 A1* | 5/2018 | Vilaipornsawai | H04W 52/0229 |
| 2018/0191065 A1* | 7/2018 | Ma | G01S 3/46 |
| 2018/0199212 A1* | 7/2018 | Lin | H04B 7/0619 |
| 2018/0219656 A1 | 8/2018 | Lee et al. | |
| 2018/0227094 A1* | 8/2018 | Liu | H04W 72/046 |
| 2020/0053713 A1 | 2/2020 | Bang et al. | |
| 2020/0383091 A1* | 12/2020 | Park | H04W 72/042 |

* cited by examiner

METHOD AND APPARATUS FOR TRANSMITTING AND RECEIVING SIGNAL FOR TERMINAL-CENTRIC COOPERATIVE TRANSMISSION

CROSS-REFERENCE TO RELATED APPLICATIONS

This application claims priority to Korean Patent Applications No. 10-2019-0138138 filed on Oct. 31, 2019 and No. 10-2020-0131741 filed on Oct. 13, 2020 in the Korean Intellectual Property Office (KIPO), the entire contents of which are hereby incorporated by reference.

BACKGROUND

1. Technical Field

The present disclosure relates to a mobile communication system and a multi-transmission point transmission method for a high capacity service, and more particularly, to a method and an apparatus for selecting transmission and reception points (TRPs) capable of performing transmissions for a specific terminal among multiple TRPs, and enhancing system performance through cooperative transmission of the selected TRPs.

2. Description of Related Art

In order to accommodate the rapidly increasing mobile data traffic, a communication system (e.g., new radio (NR) system) using a frequency band (e.g., frequency band of 6 GHz or above) higher than a frequency band (e.g., frequency band of 6 GHz or below) of a conventional wireless communication system (e.g., long term evolution (LTE) system) is being considered. The NR can support not only a frequency band of 6 GHz or above but also a frequency band of 6 GHz or below, and can support various communication services and scenarios compared to the LTE. For example, major service scenarios of the NR include enhanced Mobile BroadBand (eMBB), Ultra Reliable Low Latency Communication (URLLC), and Massive Machine Type Communication (mMTC), and the like, and various technical requirements to support these should be satisfied.

In a mobile communication system beyond 5G, a plurality of physically separated transceivers may be configured to increase system capacity in a dense terminal environment. The physically separated transmission and reception point is called a Tx/Rx point (TRP), and one TRP may be configured with one or more antennas. The TRPs may be located at a very close distance of several meters to tens of meters, and the TRP may be implemented in various forms such as a gNB, radio remote head (RRH), or RRH including some layer1 (L1) functions. In an environment in which TRPs are densely deployed, the TRPs may cooperate to transmit and receive signals to increase capacity, and for cooperative transmission, channel information between the TRPs and the terminals is required. Therefore, the overhead for signaling the channel information between the TRPs and the terminals is very large, and it is desirable to reduce the overhead.

SUMMARY

Accordingly, exemplary embodiments of the present disclosure provide a method for transmitting and receiving signals, performed by a terminal, in a cloud radio access network (C-RAN) environment including a controller, a plurality of TRPs, and the terminal. Accordingly, exemplary embodiments of the present disclosure also provide a C-RAN system including a controller, a plurality of TRPs, and a terminal. Accordingly, exemplary embodiments of the present disclosure also provide an apparatus constituting the C-RAN system.

According to exemplary embodiments of the present disclosure, a method for transmitting and receiving signals, performed by a terminal, in a C-RAN environment including a controller, a plurality of TRPs, and the terminal, may comprise: sequentially transmitting fixed beams; receiving, from at least one first TRP determined as TRP(s) performing signal transmission and reception with the terminal among the plurality of TRPs, control information including information on whether to transmit a reference signal for reception of downlink data and an index of a transmission beam selected for uplink transmission; and receiving the downlink data from the at least one first TRP, and demodulating the downlink data by using a reception beam weight derived from a weight used for transmission of the fixed beams or by using the reference signal.

The C-RAN environment may be an ultra-dense network (UDN) environment in which the plurality of TRPs and a plurality of terminals including the terminal are densely deployed.

The fixed beams may be sequentially transmitted according to predetermined or configured beam patterns, and a reference signal or a synchronization signal mapped to an identifier of the terminal and an identifier of each of the fixed beams may be transmitted through each of the fixed beams.

Each of the plurality of TRPs may transfer channel values estimated using the fixed beams to the controller, and the controller may determine the at least one first TRP based on the channel values transferred from the plurality of TRPs.

When the terminal supports two or more downlink transmission layers, the controller may further determine a weight of each of the at least one first TRP for each of the two or more downlink transmission layers.

TRPs transmitting downlink data to the terminal through a first transmission layer among the two or more downlink transmission layers may be at least partially different from TRPs transmitting downlink data to the terminal through a second transmission layer among the two or more downlink transmission layers.

Each of the plurality of TRPs may transfer received signal strengths for the terminal measured using the fixed beams to the controller, and the controller may determine the transmission beam selected for uplink transmission based on the received signal strengths.

The method may further comprise transmitting uplink data to the at least one first TRP by using the transmission beam selected for uplink transmission.

Furthermore, according to exemplary embodiments of the present disclosure, a method for transmitting and receiving signals, performed by a terminal, in a C-RAN environment including a controller, a plurality of TRPs, and the terminal, may comprise: sequentially transmitting fixed beams; receiving, from at least one first TRP determined as TRP(s) performing signal transmission and reception with the terminal among the plurality of TRPs, beamformed downlink data and reference signal; demodulating the downlink data using the reference signal; and deriving channel values for each downlink layer of the at least one first TRP using the reference signal, applying beamforming based on the channel values to uplink data by a necessary number of layers, and transmitting the uplink data.

The C-RAN environment may be an ultra-dense network (UDN) environment in which the plurality of TRPs and a plurality of terminals including the terminal are densely deployed.

The fixed beams may be sequentially transmitted according to predetermined or configured beam patterns, and a reference signal or a synchronization signal mapped to an identifier of the terminal and/or an identifier of each of the fixed beams may be transmitted through each of the fixed beams.

Each of the plurality of TRPs may transfer channel values estimated using the fixed beams to the controller, and the controller may determine the at least one first TRP based on the channel values transferred from the plurality of TRPs.

When the terminal supports two or more downlink transmission layers, the controller may further determine a weight of each of the at least one first TRP for each of the two or more downlink transmission layers.

TRP(s) receiving the uplink data may transfer log likelihood ratio (LLR) values of the received uplink data to the controller, and the controller may combine the LLR values to determine the uplink data.

Furthermore, according to exemplary embodiments of the present disclosure, a C-RAN system comprising: a controller; a plurality of TRPs connected to the controller; and a terminal, wherein, the terminal sequentially transmits fixed beams; receives, from at least one first TRP determined as TRP(s) performing signal transmission and reception with the terminal among the plurality of TRPs, control information including information on whether to transmit a reference signal for reception of downlink data and an index of a transmission beam selected for uplink transmission; and receives the downlink data from the at least one first TRP, and demodulates the downlink data by using a reception beam weight derived from a weight used for transmission of the fixed beams or by using the reference signal, and wherein each of the plurality of TRPs transfers channel values estimated using the fixed beams to the controller, and the controller determines the at least one first TRP based on the channel values transferred from the plurality of TRPs.

The C-RAN environment may be an ultra-dense network (UDN) environment in which the plurality of TRPs and a plurality of terminals including the terminal are densely deployed.

The fixed beams may be sequentially transmitted according to predetermined or configured beam patterns, and a reference signal or a synchronization signal mapped to an identifier of the terminal and/or an identifier of each of the fixed beams may be transmitted through each of the fixed beams.

When the terminal supports two or more downlink transmission layers, the controller may further determine a weight of each of the at least one first TRP for each of the two or more downlink transmission layers.

Each of the plurality of TRPs may transfer received signal strengths for the terminal measured using the fixed beams to the controller, and the controller may determine the transmission beam selected for uplink transmission based on the received signal strengths.

The terminal may transmit uplink data to the at least one first TRP by using the transmission beam selected for uplink transmission.

The exemplary embodiments of the present disclosure relate to a method for transmitting and receiving signals between a plurality of TRPs physically separated and a terminal in a UDN environment, and an apparatus therefor. Using the exemplary embodiments of the present disclosure, data transmission and reception for a terminal may be performed through a combination of TRPs that maximize signal-to-interference-plus-noise ratio (SINR). In addition, a problem of performance degradation due to fixed beam transmission using a combination of predetermined TRPs may be solved, and even when transmission is performed using a plurality of downlink transmission layers to the terminal, optimal TRPs may be selected for each layer, and thus the system capacity can be maximized. Even in uplink transmission, the system efficiency can be improved by reducing interference between terminals by using a variable beam having a narrower beam width rather than a fixed beam.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
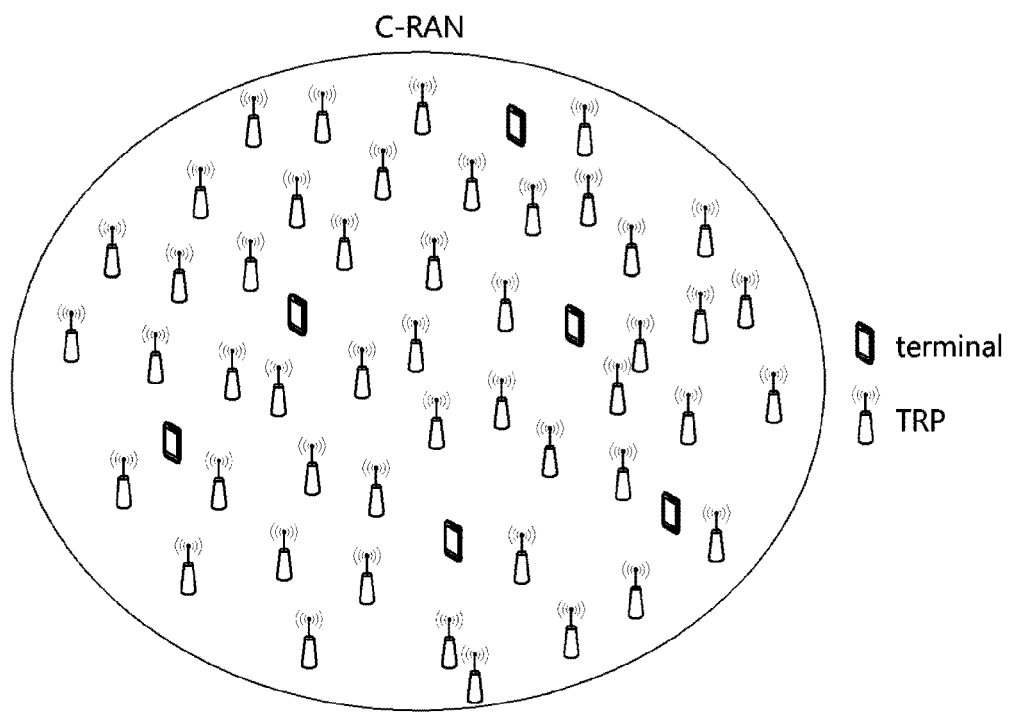
FIG. 1 is a conceptual diagram illustrating an ultra-dense network (UDN) environment to which exemplary embodiments according to the present disclosure are applied.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a conceptual diagram illustrating an ultra-dense network (UDN) environment to which exemplary embodiments according to the present disclosure are applied.

Referring to FIG. 1, an ultra-dense network (UDN) environment in which base stations (hereinafter, a more general term 'Tx/Rx point (TRP)' is used) is shown. In a mobile communication beyond 5G, in order to increase system capacity in a dense terminal environment, a plurality of physically separated transmission and reception points may be located at a high density as shown in FIG. 1.

Each physically separated transmission and reception point is called a Tx/Rx point (TRP), and one TRP may include one or more antennas. The TRPs may be located at a very close distance of several meters to tens of meters, and the TRP may be implemented in various forms such as a gNB, radio remote head (RRH), or RRH including some layer 1 (L1) functions. In an environment where TRPs are densely deployed, the TRPs may cooperate to transmit and receive signals to increase capacity, and for cooperative transmission, channel information (hereinafter, 'channel value' is also used in the same sense) between the TRPs and the terminals is required. In such the dense environment, it is advantageous to use a time division duplex (TDD) scheme capable of using channel reciprocity in order to reduce overhead for signaling the channel information between the TRPs and the terminals. Therefore, the TDD scheme is also considered in the following exemplary embodiments of the present disclosure.

Meanwhile, in the dense TRP/terminal environment, a received signal strength increases due to a close distance between the TRP and the terminal, but a strength of interference increases proportionally to the received signal strength. Accordingly, although the number of TRPs increases, the system capacity may not increase proportionally. In order to proportionally increase the system capacity according to the number of TRPs, cooperative transmission capable of maximizing SINR using channel information of all TRPs may be performed. For efficient cooperative transmission, a cloud radio access network (C-RAN) architecture comprising TRPs and a controller that determines TRPs participating in cooperative transmission and beam weights of each of the TRP may be considered.

Figure 2:
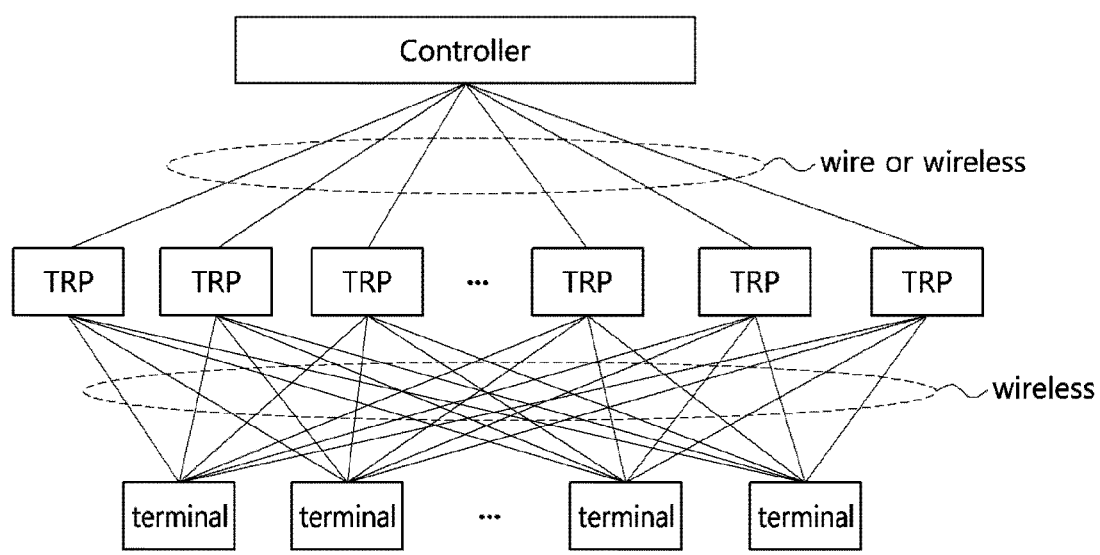
FIG. 2 is a conceptual diagram for describing a relationship between a controller, TRPs, and terminals in a C-RAN architecture.

FIG. 2 is a conceptual diagram for describing a relationship between a controller, TRPs, and terminals in a C-RAN architecture.

Referring to FIG. 2, in the C-RAN architecture, a plurality of terminals may wirelessly transmit and receive signals wirelessly with TRPs, and a plurality of TRPs may be connected to one controller by wire or wirelessly. In the C-RAN architecture, a controller that can control each TRP is required. The controller may be located in a cloud as shown in FIG. 2 or may be located independently between the TRPs and the cloud. Alternatively, one of the TRPs may serve as the controller.

Meanwhile, in order to support a millimeter wave band, the 5G system applies beamforming to a synchronization signal, unlike the 4G LTE. Therefore, in the 5G system, an initial access procedure may be performed as follows.

1) A gNB transmits a synchronization signal by applying beam-sweeping according to predetermined beam patterns regardless of a radio channel.

2) The gNB transmits system information (e.g., master information block (MIB)) on a physical broadcast channel (PBCH) through the same beam sweeping as the synchronization signal.

Meanwhile, in 1) and 2), the synchronization signal and the PBCH may be transmitted in units of a synchronization signal/physical broadcast channel (SS/PBCH) block.

3) A terminal transmits a random access channel through a single beam or by applying beam sweeping.

4) The gNB transmits a random access response (RAR) and system information for the random access terminal through a beam selected by the terminal. In this case, the gNB can identify the beam selected by the terminal from a timing at which the random access channel is received from the terminal.

5) The gNB transmits control information and data through a physical downlink control channel (PDCCH) and a data channel (physical downlink shared channel (PDSCH)), respectively, using the beam selected by the terminal.

6) Depending on capabilities of the gNB, when the gNB additionally transmits a channel state information-reference signal (CSI-RS), the terminal receiving the CSI-RS may feedback channel information, and the gNB may use the channel information to perform more detailed beamforming to transmit control information and data to the terminal.

In the description of the following exemplary embodiments, for convenience of description, selecting one of predetermined beam patterns regardless of channel information and transmitting control information or data is defined as 'fixed beamforming (or analog beamforming)', and generating a beam using channel information and transmitting data or control information is defined as 'variable beamforming (or digital beamforming)'. The 5G system has a structure of improving performance by performing the variable beamforming according to the capabilities of the gNB after performing the fixed beamforming. That is, in the above-described procedure, the steps 1) to 5) correspond to the fixed beamforming, and the step 6) corresponds to the variable beamforming.

Figure 3:
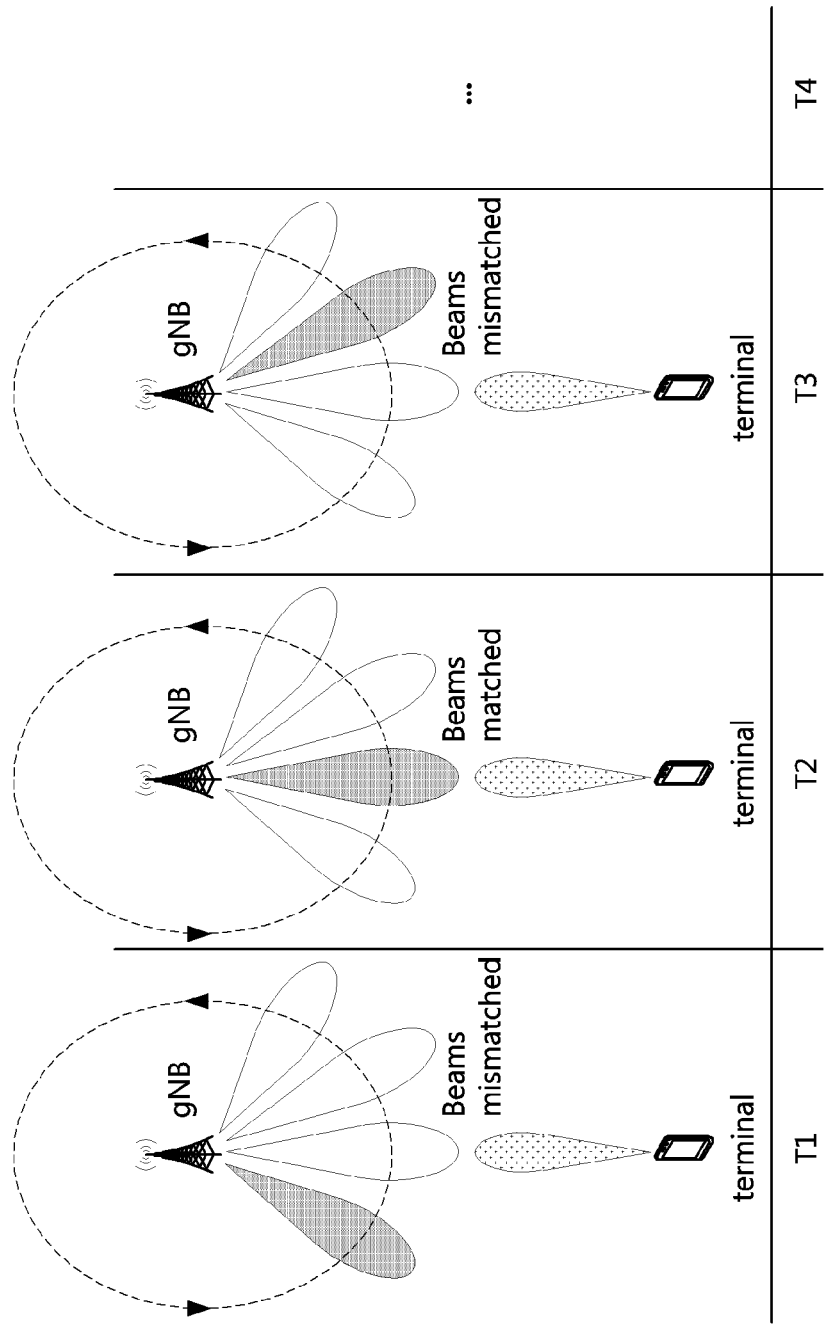
FIG. 3 is a conceptual diagram for describing a fixed beamforming.

FIG. 3 is a conceptual diagram for describing a fixed beamforming.

Referring to FIG. 3, in the 5G system, the gNB may transmit a synchronization signal by applying beam-sweeping using N predefined beam patterns. For example, the gNB may transmit a synchronization signal at a time T1 using a beam pattern #1, transmit a synchronization signal at a time T2 using a beam pattern #2, transmit a synchronization signal at a time T3 using a beam pattern #3, and transmit a synchronization signal at a time TN using a beam pattern #N. After the time TN, the beam pattern #1 to the beam pattern #N may be repeatedly transmitted. The terminal may select an optimal beam (e.g., beam pattern #2 received at the time T2) among the beams transmitted by the gNB. In this structure, the gNB that transmits signals to the terminal is determined, and accordingly, the antennas that transmit the signal to the terminal are also determined in advance.

Meanwhile, when the terminal selects a beam and the base station identifies the beam selected by the terminal in the fixed beamforming step, the variable beamforming may be performed. As described above, the base station can identify the beam selected by the terminal from the timing at which the terminal transmits the random access channel to the base station.

Figure 4:
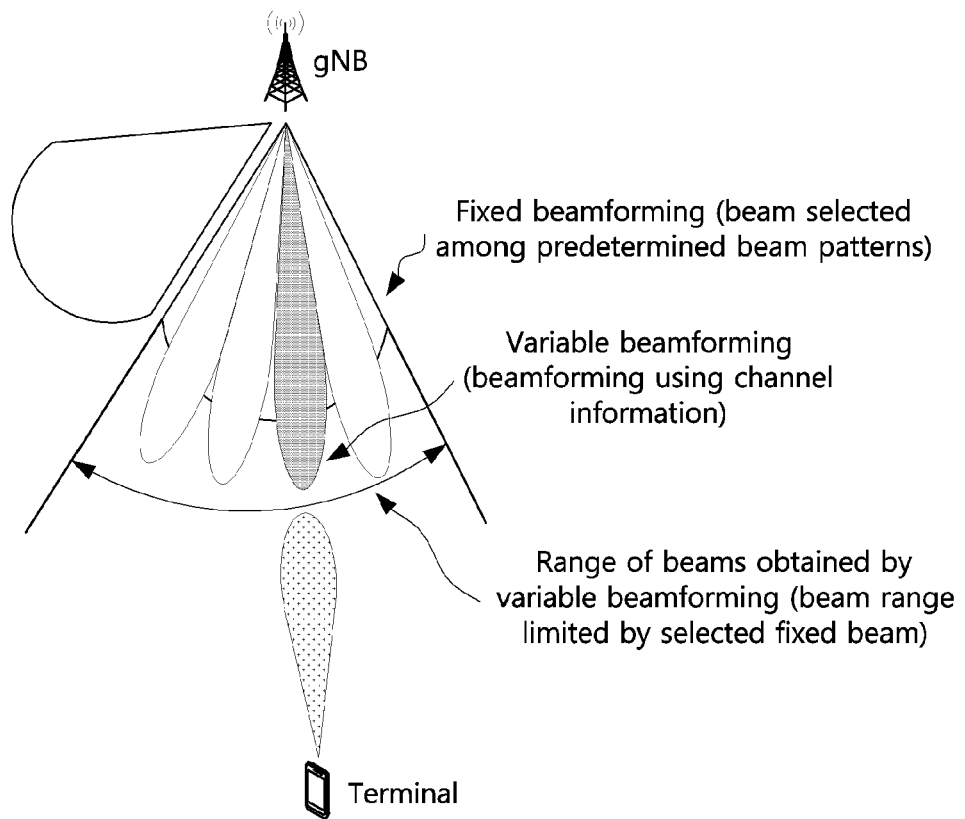
FIG. 4 is a conceptual diagram for describing a variable beamforming.

FIG. 4 is a conceptual diagram for describing a variable beamforming.

Referring to FIG. 4, the base station and the terminal may perform variable beamforming using channel information while transmitting and receiving CSI-RS and measured channel information within a beam range determined by the beam selected from among the predetermined beam patterns.

Figure 5:
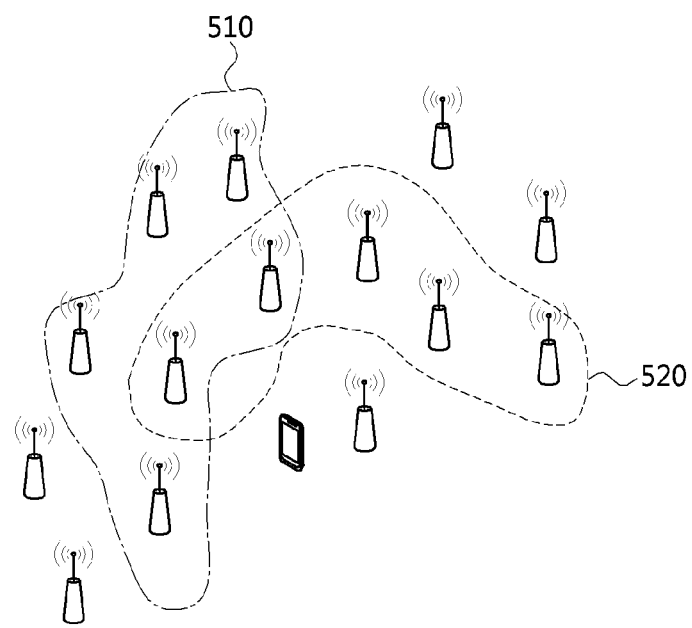
FIG. 5 is a conceptual diagram illustrating a problem when fixed beamforming or variable beamforming within a limited range is performed in a C-RAN architecture.

FIG. 5 is a conceptual diagram illustrating a problem when fixed beamforming or variable beamforming within a limited range is performed in a C-RAN architecture.

Even in the C-RAN architecture, if the TRPs transmit and receive signals by performing beamforming with a fixed beam selected among beams regardless of a channel, or by performing variable beamforming within a range limited by the selected fixed beam, as in the 5G system described above, a problem of capacity reduction may occur. Referring to FIG. 5, TRPs 510 participating in transmission for the fixed beamforming for the terminal or the variable beamforming within the range limited by the selected beam may be different from TRPs 520 that maximize SINR for the terminal. Therefore, a reduction in capacity may occur due to this difference.

If each of the terminal and the TRPs has one or more antennas, each terminal or each TRP may support four types of transmission schemes as follows.

Transmission without beamforming
Fixed beamforming transmission
Variable beamforming transmission
Fixed beamforming+variable beamforming transmission (e.g., hybrid beamforming)

Accordingly, a total of 16 transmission/reception combinations may exist between the terminal and the TRP as shown in Table 1.

TABLE 1

| | TRP | | | |
|---|---|---|---|---|
| Terminal | No beam-forming | Fixed beam-forming | Variable beam-forming | Fixed beam-forming + Variable beamforming |
| No beamforming | Case 1 | Case 5 | Case 9 | Case 13 |
| Fixed beamforming | Case 2 | Case 6 | Case 10 | Case 14 |
| Variable beamforming | Case 3 | Case 7 | Case 11 | Case 15 |
| Fixed beamforming + Variable beamforming | Case 4 | Case 8 | Case 12 | Case 16 |

In the following, among the combinations summarized in Table 1, methods of transmitting/receiving signals in the C-RAN architecture for the case 10 in which the terminal uses fixed beamforming and the TRP uses variable beamforming and the case 12 in which the terminal uses fixed beamforming+variable beamforming and the TRP uses variable beamforming will be described. Equations used in the following description are for better understanding of the exemplary embodiments, and only portions necessary for the description are described, and unnecessary portions (e.g., subcarrier numbers in the OFDM scheme) are omitted.

Figure 6:
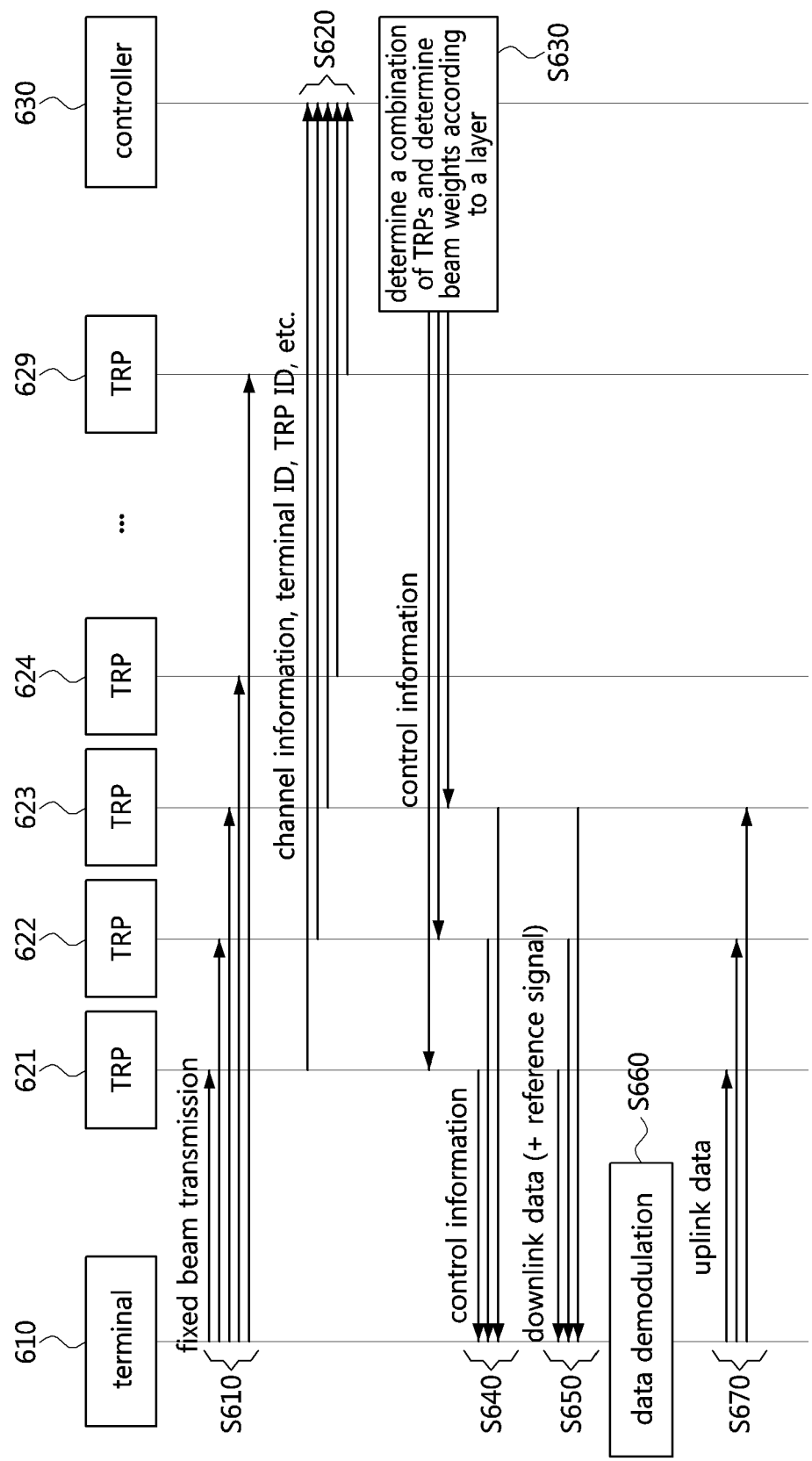
FIG. 6 is a sequence chart illustrating a signal transmission/reception method according to an exemplary embodiment of the present disclosure.
Figure 7:
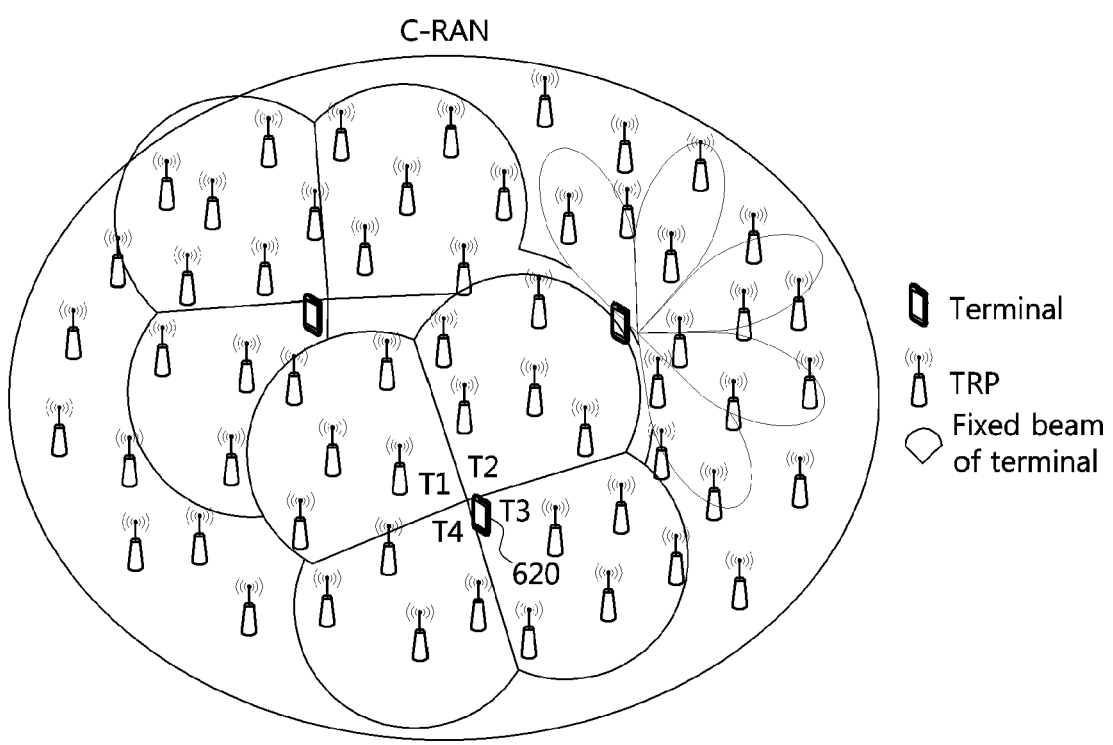
FIG. 7 is a conceptual diagram illustrating a beam-sweeping operation of a terminal in a signal transmission/reception method according to an exemplary embodiment of the present disclosure.

FIG. 6 is a sequence chart illustrating a signal transmission/reception method according to an exemplary embodiment of the present disclosure, and FIG. 7 is a conceptual diagram illustrating a beam-sweeping operation of a terminal in a signal transmission/reception method according to an exemplary embodiment of the present disclosure.

The exemplary embodiment shown in FIG. 6 is an exemplary embodiment that may be applied to the dense TRP environment according to the case 10 described above. For convenience of description, FIG. 6 shows an environment in which one terminal 610, some of a plurality of TRPs 621 to 629, and a controller 630 operate. However, in the dense terminal/TRP environments, more TRPs and terminals may exist.

Referring to FIG. 6, the terminal 610 may sequentially transmit fixed beams according predetermined patterns (S610). Specifically, the terminal 610 may sequentially transmit fixed beams according to predetermined or configured beam patterns so that the TRPs 621 to 629 identify channel information. For example, the terminal 610 may sequentially transmit four beams at time points T1, T2, T3, and T4. In this case, in order for the TRP to identify which beam of the terminal a received signal is, the terminal may transmit a reference signal (or, synchronization signal), that is mapped to the following control information and can be used for channel estimation, to the TRPs 621 to 629 through time domain resources and/or frequency domain resources.

Terminal identifier (ID)
ID of a beam currently being transmitted by the terminal Using the mapping relationship between the reference signal (or synchronization signal) and the control information, the TRPs may identify for which beam of which terminal the received reference signal (or synchronization signal) is. Information on the mapping relationship may be shared in advance between the TRPs 621 to 629 and the terminal. The reference signal transmitted from the terminal may be expressed as Equation 1 below.

$$S_{i,l} = W_{i,l} p_{i,l} \quad \text{[Equation 1]}$$

Here, $W_{i,l}$ denotes a weight of an l-th beam among the fixed beams sequentially transmitted from a terminal i, and $p_{i,l}$ denotes a value constituting a reference signal $P_{i,l}$ transmitted from the terminal i through the l-th beam. As described above, $P_{i,l}$ may be uniquely mapped to the terminal ID and the beam ID of the terminal.

Each of the TRPs 621 to 629 may estimate a channel from the reference signal uniquely mapped to the terminal ID and the beam ID, which is received through a radio channel. For example, the channel estimated from the reference signal may be expressed as Equation 2 below.

$$\tilde{H}_{i,l}^m = H_{i,l}^m W_{i,l} \quad \text{[Equation 2]}$$

Here, m is an ID of each TRP. Each TRP may transfer the estimated channel information to the controller 630 together with the following information (S620).

TRP ID
Terminal ID
ID of the beam currently received for each terminal
Channel value of the currently received beam for each terminal Then, the controller 630 may determine a combination of TRPs capable of maximizing a downlink SINR from the information received from the respective TRPs, and beam weights according to transmission layer(s), inform the determined TRPs that they are selected for transmission/reception with the terminal 610, and transfer control information necessary for downlink/uplink transmission to the determined combination of TRPs (S630).

In addition, the controller may compare received signal strengths at the TRPs of the fixed beams sequentially transmitted from the terminal to select a transmission beam having the largest received signal strength as a beam for uplink data transmission of each terminal. In this case, in the step S620, each TRP may additionally report the measured received signal strengths of the fixed beams transmitted by the terminal to the controller 630. Alternatively, the controller 630 may calculate the received signal strengths using the channel values transferred from each TRP.

For example, the channel information of the TRPs 621 to 629 transferred to the controller 630 in the above-described step S620 may be expressed as Equation 3 below. Here, $M_{i,l}$ is the number of TRPs that have received the l-th beam of the terminal i, and l is a number (index) of the received beam among $L_i$ beams of the terminal i.

$$\tilde{H}_{i,l} = \begin{bmatrix} \tilde{H}_{i,0}^0 \\ \tilde{H}_{i,0}^1 \\ \vdots \\ \tilde{H}_{i,0}^{M_{i,l}-1} \end{bmatrix} \quad \text{[Equation 3]}$$

That is, the controller 630 has channel value(s) by $L_i$ beam(s) from $M_{i,l}$ TRP(s) for downlink transmission to the terminal i. The controller 630 may use channel values $\tilde{H}_{i,l}$ received from each terminal through $L_i$ beams to determine transmission weights for each of all configurable combinations for downlink transmission, and sort the transmission weights in order of higher SINR. Exemplary methods for determining the transmission weights are as follows.

1) Since the controller 630 knows the ID of the currently received beam for each TRP/terminal, the controller 630 may obtain a pure channel $H_{i,l}^m$ by removing $W_{i,l}$ from $H_{i,l}^m W_{i,l}$. The controller 630 may use this to obtain the transmission weights. In this case, for data demodulation in the terminal, each TRP may transmit a reference signal having the same transmission weight together with downlink data.

2) The controller 630 may obtain the transmission weights from $H_{i,l}^m W_{i,l}$ of the step S620, which have been received as being beamformed. In this case, the reference signal for data demodulation may not be required depending on the configuration of the selected TRPs.

As a method of deriving the beam weights, at least one of various schemes such as maximal ratio transmission, zero-forcing transmission, minimum mean square error (MMSE) transmission, and block diagonalization transmission may be used. When the terminal has ability to receive two or more layers, the controller 630 may determine the number of downlink layers for each terminal by using the sorted SINRs to maximize system capacity. For example, the TRPs selected by the controller 630 for downlink transmission to the terminal i and the weights according to them may be expressed as in Equation 4 below.

$$G_{i,r} = \{g_{i,r}^0, g_{i,r}^1, \ldots, g_{i,r}^c, \ldots, g_{i,r}^{C-1}\} \quad \text{[Equation 4]}$$

Here, $g_{i,r}^0$ is a weight for a layer r of the terminal i in downlink transmission of a TRP c. That is, data of the layer r of the terminal i may be transmitted through C TRPs. The controller 630 may select one TRP so that the one TRP transmits data to multiple terminals instead of one terminal. In addition, data may be beamformed and transmitted without a reference signal according to a combination of TRPs configured for transmission.

In the following description, it is assumed that the TRPs 621, 622, and 623 are selected from among the TRPs 621 to 629 in the step S630.

The controller 630 may transfer the following control information to the TRPs selected for data transmission (S640).

Terminal ID
Number of layers per terminal

Transmission weight according to a layer for each terminal

Whether to transmit a reference signal for data reception

Index of a transmission beam of the terminal, which is selected for uplink transmission The TRPs 621, 622, and 623 may perform beamforming on control information and downlink data using the information received from the controller 630, and transmit the beamformed control information and downlink data to the terminal 610 (S650). The control information is transmitted together with a reference signal, but the data may be transmitted to the terminal without a reference signal in order to reduce a transmission overhead according to 'whether to transmit a reference signal for data reception' received from the controller 630.

The control information includes whether or not the beamformed data is transmitted together with a reference signal, and an index of a transmission beam to be used for uplink data transmission by the terminal, which has been selected by the controller. The reference signal may be beamformed and transmitted in the same manner as the control information or data for channel estimation by the terminal.

For example, a downlink data transmission signal for the layer r transmitted from the TRP c to the terminal i may be expressed as in Equation 5 below.

$$a_{i,r}^c = g_{i,r}^c f_{i,r}^{DL}$$ [Equation 5]

Here, $f_{i,r}^{DL}$ is downlink transmission data or a reference signal for the layer r transmitted to the terminal i.

If the terminal 610 identifies that only the data has been transmitted without a reference signal through the control information, the terminal 610 may derive reception beam weights from predetermined transmission beam weights of the terminal (e.g., weights used for transmission of the fixed beam), and demodulate the data using the reception beam weights (S660). On the other hand, if it is identified that the data has been received together with the reference signal through the control information in the step S640, the terminal may demodulate the data transmitted from the TRPs by using the reference signal.

Unlike uplink transmission in which beams are sequentially transmitted due to a limited transmission power, in case of reception, the terminal may simultaneously receive beams of all patterns. For example, a received signal for the layer r of the terminal i may be expressed as in Equation 6 below.

$$y_{i,r} = \sum_{c=0}^{C-1} H_{i,r}^c a_{i,r}^c$$ [Equation 6]

Here, as described in the step S630, signals transmitted through C TRPs are received by the terminal. The terminal may transmit uplink data using a beam corresponding to the index of the transmission beam selected for uplink transmission included in the control information received from the TRP in the step S640 (S670).

Figure 8:
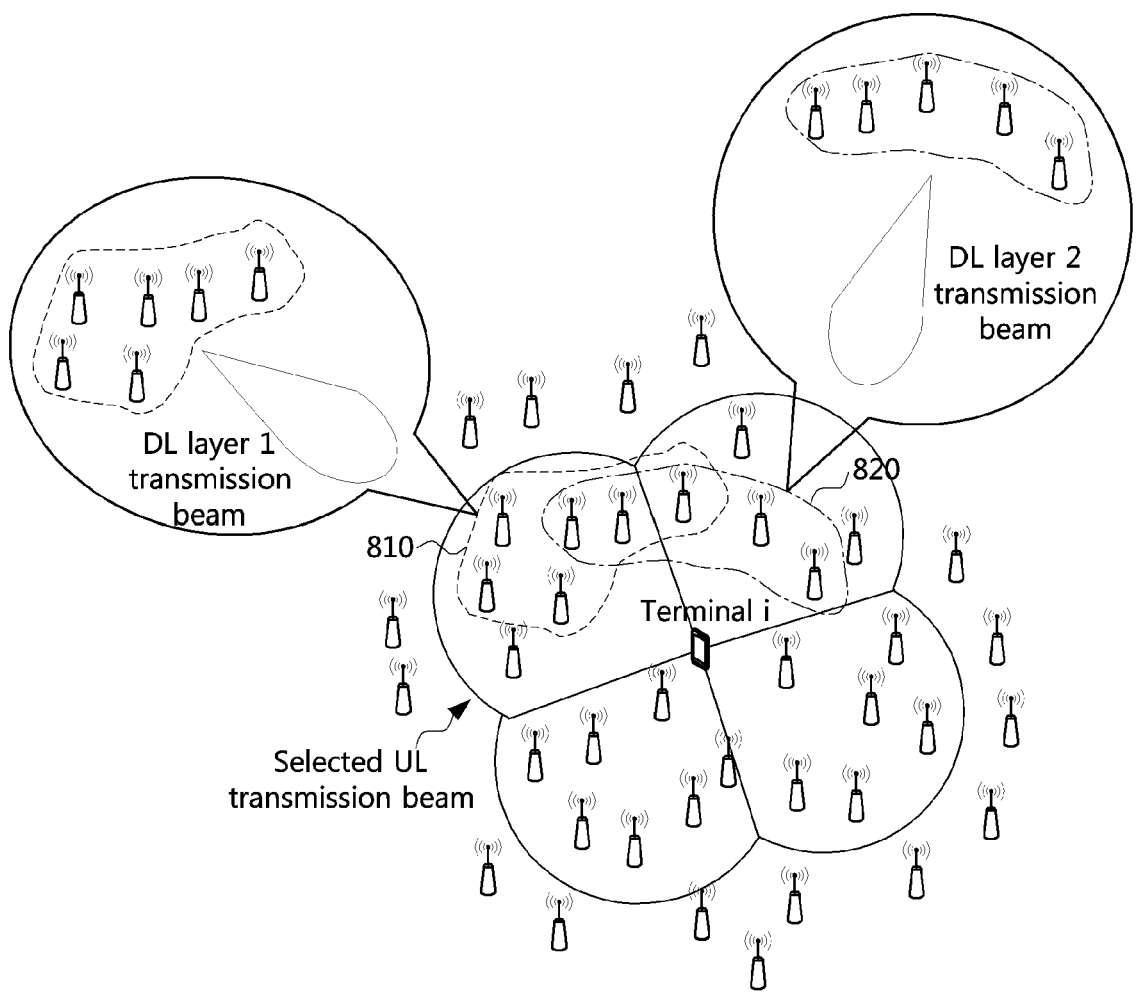
FIG. 8 is a conceptual diagram illustrating a case in which two downlink transmission layers are used in a signal transmission/reception method according to an exemplary embodiment of the present disclosure.

FIG. 8 is a conceptual diagram illustrating a case in which two downlink transmission layers are used in a signal transmission/reception method according to an exemplary embodiment of the present disclosure.

When the terminal 610 supports two or more downlink transmission layers, TRPs 810 transmitting downlink data to the terminal 610 through a first transmission layer among two or more downlink transmission layers may be at least partially different from TRPs 820 transmitting downlink data to the terminal 610 through a second transmission layer among the two or more downlink transmission layers. That is, according to an exemplary embodiment of the present disclosure, TRPs to perform transmission for each layer may be selected so as to maximize performance in transmission of each downlink layer. Also, the terminal 610 may perform uplink transmission using the beam indicated by the controller among a plurality of transmission beams.

Figure 9:
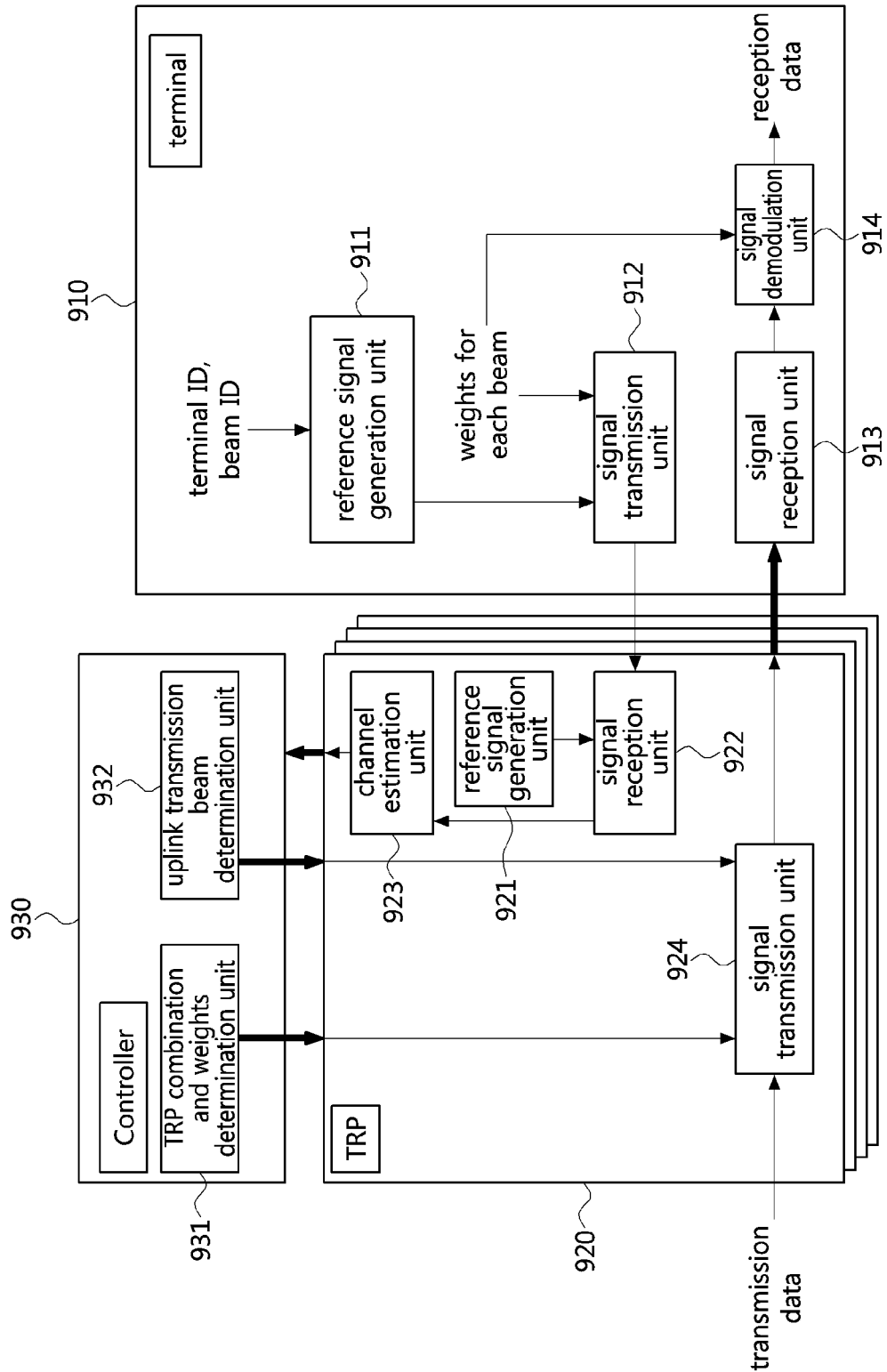
FIG. 9 is a block diagram illustrating a configuration example of each apparatus for performing a signal transmission/reception method according to an exemplary embodiment of the present disclosure.

FIG. 9 is a block diagram illustrating a configuration example of each apparatus for performing a signal transmission/reception method according to an exemplary embodiment of the present disclosure.

Referring to FIG. 9, a reference signal generation unit 911 of a terminal 910 may receive a terminal ID and a beam ID, and generate a reference signal (e.g., a reference signal sequence) uniquely mapped to the terminal ID and the beam ID. A signal transmission unit 912 may beamform the reference signal sequence generated by using weights of a predetermined beam pattern between TRPs and the terminal 910 and transmit it to a TRP 920.

In the TRP 920, a reference signal sequence uniquely mapped to the terminal ID and the beam ID generated using a reference signal generation unit 921 operating in the same manner as the reference signal generation unit 911 of the terminal 910 may be input to a signal reception unit 922. In addition, the signal reception unit 922 receiving the reference signal from the signal transmission unit 912 of the terminal 910 may forward the received reference signal to a channel estimation unit 923, and the channel estimation unit 923 may transfer a channel estimation value to a controller 930. Meanwhile, in FIG. 9, a configuration example of the TRP 920, which is one TRP among a plurality of TRPs, is shown, but each of the plurality of TRPs may have the same configuration as the TRP 920.

When channel estimation values from TRPs including the TRP 920 (i.e., TRPs that have received the reference signal from the terminal 910) are collected in the controller 930, a TRP combination and weights determination unit 931 of the controller 930 may determine a combination of TRPs for downlink transmission to the terminal 910 and transmission beam weights, and an uplink transmission beam determination unit 932 may determine an uplink transmission beam of the terminal, which is to be used for uplink transmission. Information on the determined combination of TRPs, transmission beam weights, and the transmission beam of the terminal 910 may be transferred to the determined TRPs. A signal transmission unit 924 of the TRP 920 may perform beamforming on transmission data by applying the beam weights transferred from the controller 930 and transmit the transmission data.

After a signal reception unit 913 of the terminal 910 receives signals from the TRPs including the TRP 920, a signal demodulation unit 914 of the terminal 910 may restore the data transmitted by the TRPs by performing modulation operations such as channel estimation, decoding, and the like by using reception beam weights derived from weights for each beam or using the reference signal received from the TRPs.

Figure 10:
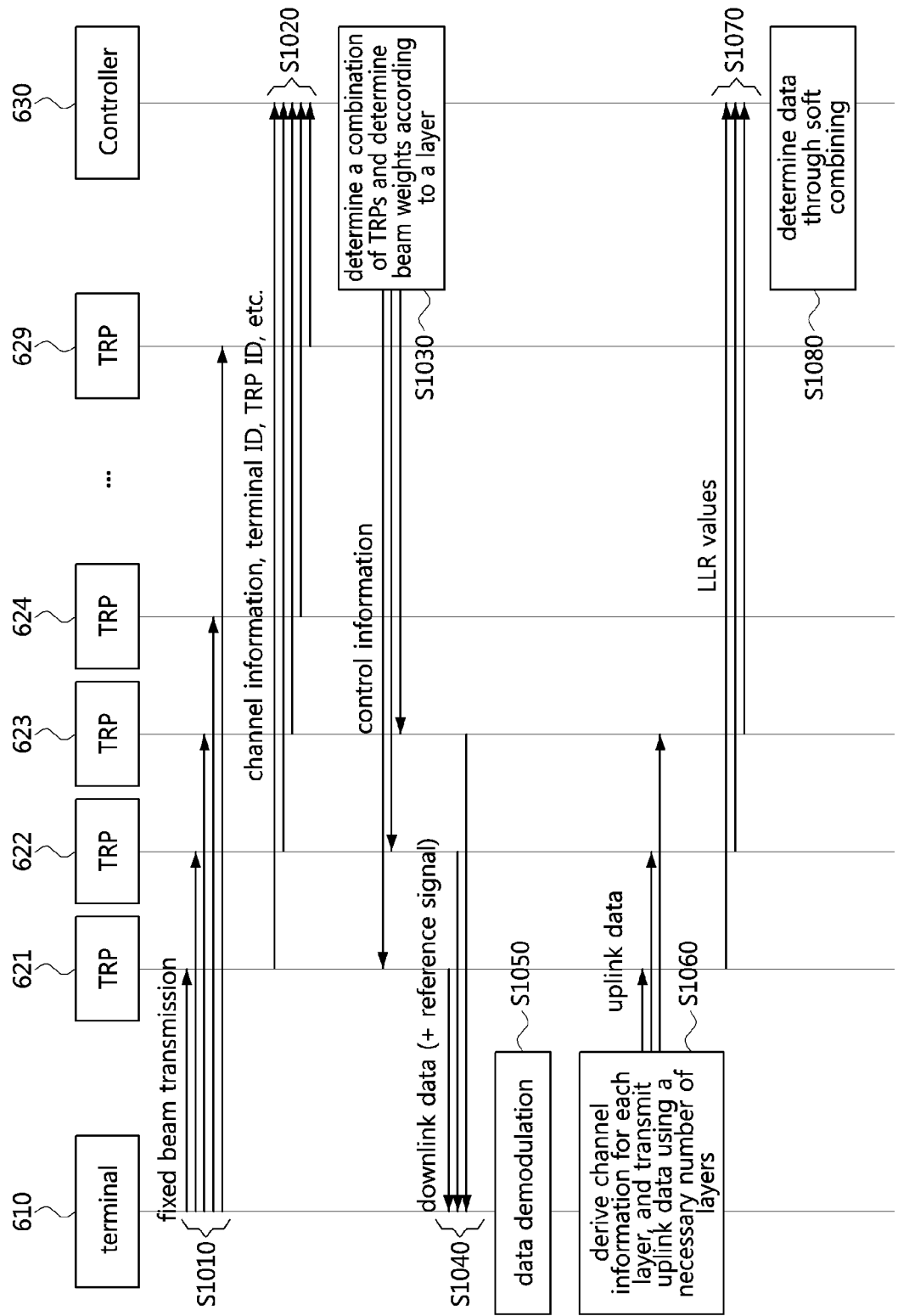
FIG. 10 is a sequence chart illustrating a method of transmitting and receiving a signal according to another exemplary embodiment of the present disclosure.

FIG. 10 is a sequence chart illustrating a method of transmitting and receiving a signal according to another exemplary embodiment of the present disclosure.

The exemplary embodiment shown in FIG. 10 is an exemplary embodiment applicable to a dense TRP environment according to the case 12 described above. FIG. 10 shows, for convenience of description, an environment in which one terminal 610, some of the plurality of TRPs 621 to 629, and the controller 630 operate. However, in the dense terminal/TRP environment, more TRPs and terminals may exist.

In order to reduce an interference of the terminal's uplink transmission to other terminals, and increase sizes of received signals in the TRPs, the variable beamforming may be further applied to the terminal, thereby generating a beam having a narrower beam width within a range limited by the selected fixed beam.

Referring to FIG. 10, the steps S1010 to S1030 may be performed in the same manner as the steps S610 to S630 described above with reference to FIG. 6. Thereafter, the TRPs (e.g., 621 to 623) performing downlink transmission to the terminal 610 may perform beamforming on data and a reference signal using the information received from the controller 630, and transmit the beamformed data and reference signal to the terminal 610 (S1040). In this case, a downlink data transmission signal for the layer r transmitted from the TRP c to the terminal i may be expressed as Equation 7 below.

$$a_{i,r}^c = g_{i,r}^c f_{i,r}^{DL}$$ [Equation 7]

Here, $f_{i,r}^{DL}$ includes the data at the TRP c and the reference signal used by the terminal for channel estimation.

Thereafter, the terminal 610 (i.e., terminal i) may demodulate the downlink data using the reference signals received from the TRPs (S1050). Thereafter, the terminal i may derive a channel value for the layer r received from each TRP from the reference signal received in the step S1050 for uplink data transmission, perform beamforming on the uplink data by a necessary number of layers in order of higher SINR, and transmit the uplink data (S1060).

Specifically, the channel value estimated in the layer r of the terminal i may be expressed as Equation 8 below.

$$\tilde{H}_{i,r}^c = H_{i,r}^c g_{i,r}^c$$ [Equation 8]

The terminal may sort the derived channel values of the layers in order of the layer having the largest SINR signal, perform beamforming on the uplink data based on the channel values by U layers needed for uplink, and transmit the uplink data to the TRPs. The transmitted beam may be expressed as Equation 9 below.

$$s_{i,u} = w_{i,u} d_{i,u}^{UL}$$ [Equation 9]

Here, $w_{i,u}$ is beamforming weights derived from the downlink channel $\tilde{h}_{i,r}^c$, and $d_{i,u}^{UL}$ is the uplink data of the layer u of the terminal i.

Each of the TRPs may demodulate the uplink data of the uplink layer u received from the terminal i and transmit it to the controller 630 (S1070). For example, each of the TRPs may transmit log likelihood ratio (LLR) values, which are input values of a channel decoder, to the controller 630 for soft combining performed by the controller 630.

The controller 630 may determine reception data of the uplink layer u of the terminal i by combining the data received in the step S1070 (S1080).

Figure 11:
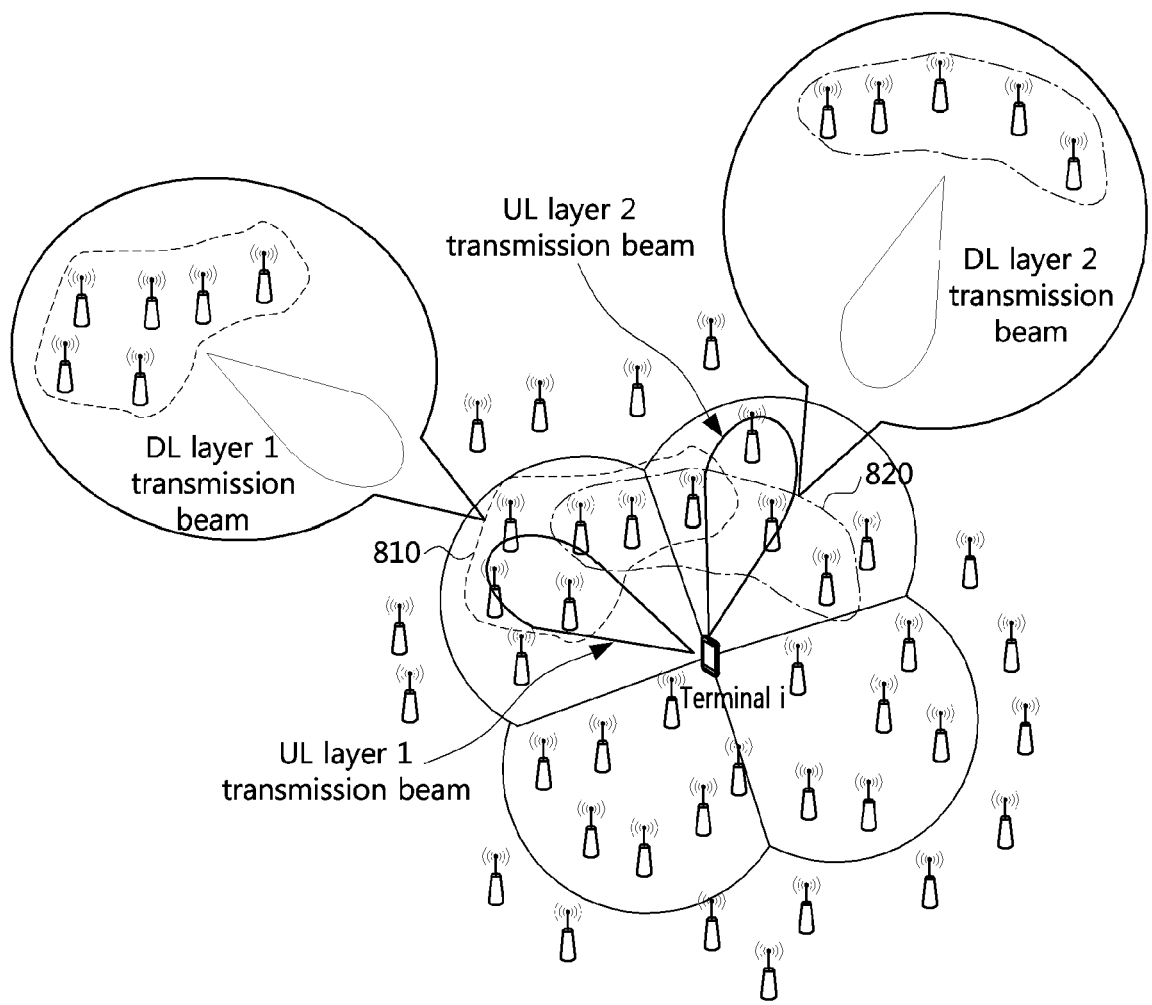
FIG. 11 is a conceptual diagram illustrating a case where two downlink transmission layers and two uplink transmission layers are used in a signal transmission/reception method according to another exemplary embodiment of the present disclosure.

FIG. 11 is a conceptual diagram illustrating a case where two downlink transmission layers and two uplink transmission layers are used in a signal transmission/reception method according to another exemplary embodiment of the present disclosure.

As in FIG. 8, when the terminal supports two or more downlink transmission layers, TRPs 810 transmitting downlink data to the terminal through a first transmission layer among the two or more downlink transmission layers may be at least partially different from TRPs 820 transmitting downlink data to the terminal through a second transmission layer among the two or more downlink transmission layers.

Referring to FIG. 11, an uplink transmission beam width of the terminal may be further reduced compared to the uplink transmission beam width shown in FIG. 8 by applying variable beamforming. Accordingly, interference caused by the uplink transmission of the terminal 610 to other terminals may be further reduced, and the received signal strength at the TRPs may be increased.

Figure 12:
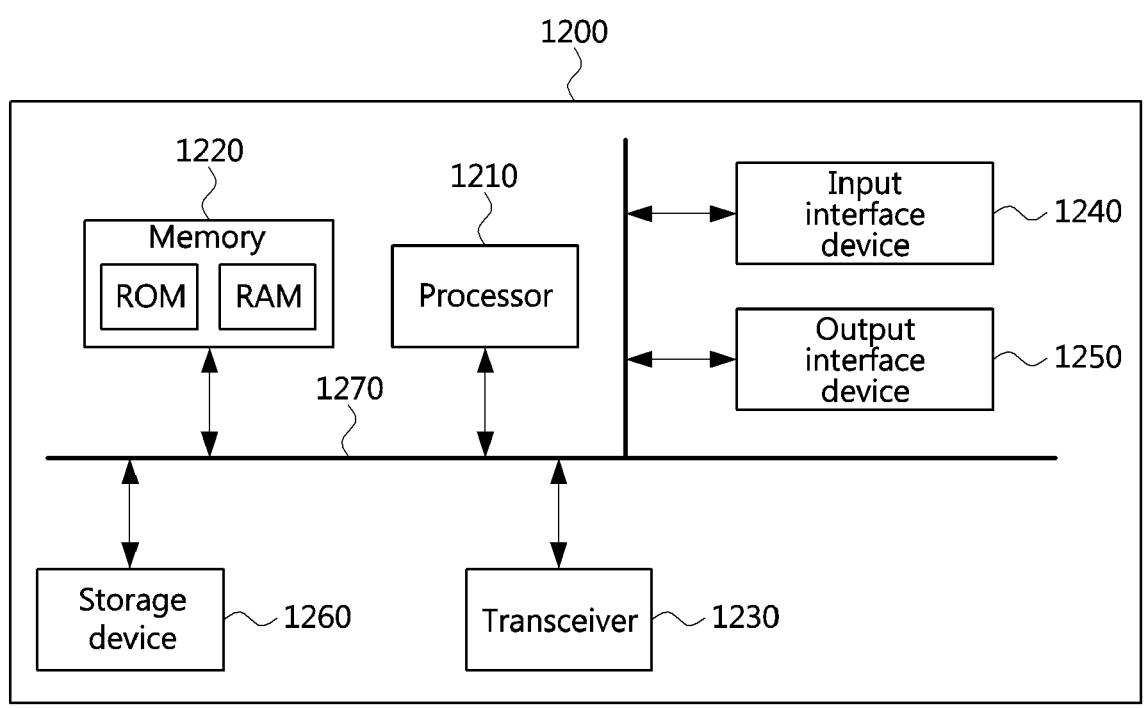
FIG. 12 is a block diagram illustrating a configuration of an apparatus for performing methods according to exemplary embodiments of the present disclosure.

FIG. 12 is a block diagram illustrating a configuration of an apparatus for performing methods according to exemplary embodiments of the present disclosure.

The apparatus illustrated in FIG. 12 may be a communication node (e.g., controller, TRP, or terminal) for performing the methods according to the exemplary embodiments of the present disclosure.

Referring to FIG. 12, a communication node 1200 may include at least one processor 1210, a memory 1220, and a transceiver 1230 connected to a network to perform communication. In addition, the communication node 1200 may further include an input interface device 1240, an output interface device 1250, a storage device 1260, and the like. The components included in the communication node 1200 may be connected by a bus 1270 to communicate with each other. However, each component included in the communication node 1200 may be connected to the processor 1210 through a separate interface or a separate bus instead of the common bus 1270. For example, the processor 810 may be connected to at least one of the memory 1220, the transceiver 1230, the input interface device 1240, the output interface device 1250, and the storage device 1260 through a dedicated interface.

The processor 1210 may execute at least one instruction stored in at least one of the memory 1220 and the storage device 1260. The processor 1210 may refer to a central processing unit (CPU), a graphics processing unit (GPU), or a dedicated processor on which the methods according to the exemplary embodiments of the present invention are performed. Each of the memory 1220 and the storage device 1260 may be configured as at least one of a volatile storage medium and a nonvolatile storage medium. For example, the memory 1220 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for transmitting and receiving signals, performed by a terminal, in a cloud radio access network (C-RAN) environment including a controller, a plurality of transmission and reception points (TRPs), and the terminal, the method comprising:
sequentially transmitting fixed beams;
receiving, from at least one first TRP determined as TRP(s) performing signal transmission and reception with the terminal among the plurality of TRPs, control information including information on whether to transmit a reference signal for reception of downlink data and an index of a transmission beam selected for uplink transmission; and
receiving the downlink data from the at least one first TRP, and demodulating the downlink data by using a reception beam weight derived from a weight used for transmission of the fixed beams or by using the reference signal,
wherein each of the plurality of TRPs transfers channel values estimated using the fixed beams to the controller, and the controller determines the at least one first TRP based on the channel values transferred from the plurality of TRPs, and
wherein when the terminal supports two or more downlink transmission layers, the controller further determines a weight of each of the at least one first TRP for each of the two or more downlink transmission layers.

2. The method according to claim 1, wherein the C-RAN environment is an ultra-dense network (UDN) environment in which the plurality of TRPs and a plurality of terminals including the terminal are densely deployed.

3. The method according to claim 1, wherein the fixed beams are sequentially transmitted according to predetermined or configured beam patterns, and a reference signal or a synchronization signal mapped to an identifier of the terminal and an identifier of each of the fixed beams is transmitted through each of the fixed beams.

4. The method according to claim 1, wherein TRPs transmitting downlink data to the terminal through a first transmission layer among the two or more downlink transmission layers are at least partially different from TRPs transmitting downlink data to the terminal through a second transmission layer among the two or more downlink transmission layers.

5. The method according to claim 1, wherein each of the plurality of TRPs transfers received signal strengths for the terminal measured using the fixed beams to the controller, and the controller determines the transmission beam selected for uplink transmission based on the received signal strengths.

6. The method according to claim 1, further comprising transmitting uplink data to the at least one first TRP by using the transmission beam selected for uplink transmission.

7. A method for transmitting and receiving signals, performed by a terminal, in a cloud radio access network (C-RAN) environment including a controller, a plurality of transmission and reception points (TRPs), and the terminal, the method comprising:
sequentially transmitting fixed beams;
receiving, from at least one first TRP determined as TRP(s) performing signal transmission and reception with the terminal among the plurality of TRPs, beamformed downlink data and reference signal;
demodulating the downlink data using the reference signal; and
deriving channel values for each downlink layer of the at least one first TRP using the reference signal, applying beamforming based on the channel values to uplink data by a necessary number of layers, and transmitting the uplink data,
wherein each of the plurality of TRPs transfers channel values estimated using the fixed beams to the controller, and the controller determines the at least one first TRP based on the channel values transferred from the plurality of TRPs, and
wherein when the terminal supports two or more downlink transmission layers, the controller further determines a weight of each of the at least one first TRP for each of the two or more downlink transmission layers.

8. The method according to claim 7, wherein the C-RAN environment is an ultra-dense network (UDN) environment in which the plurality of TRPs and a plurality of terminals including the terminal are densely deployed.

9. The method according to claim 7, wherein the fixed beams are sequentially transmitted according to predetermined or configured beam patterns, and a reference signal or a synchronization signal mapped to an identifier of the terminal and/or an identifier of each of the fixed beams is transmitted through each of the fixed beams.

10. The method according to claim 7, wherein TRP(s) receiving the uplink data transfers log likelihood ratio (LLR) values of the received uplink data to the controller, and the controller combines the LLR values to determine the uplink data.

11. A cloud radio access network (C-RAN) system comprising:
a controller;
a plurality of transmission and reception points (TRPs) connected to the controller;
a terminal,
wherein the terminal sequentially transmits fixed beams; receives, from at least one first TRP determined as TRP(s) performing signal transmission and reception with the terminal among the plurality of TRPs, control information including information on whether to transmit a reference signal for reception of downlink data and an index of a transmission beam selected for uplink transmission; and receives the downlink data from the at least one first TRP, and demodulates the downlink data by using a reception beam weight derived from a weight used for transmission of the fixed beams or by using the reference signal, and
wherein each of the plurality of TRPs transfers channel values estimated using the fixed beams to the controller, and the controller determines the at least one first TRP based on the channel values transferred from the plurality of TRPs, and
wherein when the terminal supports two or more downlink transmission layers, the controller further determines a weight of each of the at least one first TRP for each of the two or more downlink transmission layers.

12. The C-RAN system according to claim 11, wherein the C-RAN environment is an ultra-dense network (UDN) environment in which the plurality of TRPs and a plurality of terminals including the terminal are densely deployed.

13. The C-RAN system according to claim 11, wherein the fixed beams are sequentially transmitted according to predetermined or configured beam patterns, and a reference signal or a synchronization signal mapped to an identifier of the terminal and/or an identifier of each of the fixed beams is transmitted through each of the fixed beams.

14. The C-RAN system according to claim 11, wherein each of the plurality of TRPs transfers received signal strengths for the terminal measured using the fixed beams to the controller, and the controller determines the transmission beam selected for uplink transmission based on the received signal strengths.

15. The C-RAN system according to claim 11, wherein the terminal transmits uplink data to the at least one first TRP by using the transmission beam selected for uplink transmission.

\* \* \* \* \*